United States Patent
Rabkin et al.

(10) Patent No.: US 7,793,238 B1
(45) Date of Patent: Sep. 7, 2010

(54) METHOD AND APPARATUS FOR IMPROVING A CIRCUIT LAYOUT USING A HIERARCHICAL LAYOUT DESCRIPTION

(75) Inventors: Peter Rabkin, Cupertino, CA (US); Zhiyuan Wu, Sunnyvale, CA (US); Min-Hsing Peter Chen, Campbell, CA (US); Jane W. Sowards, Fremont, CA (US); Michael J. Hart, Palo Alto, CA (US); Min-Fang Ho, Monte Sereno, CA (US)

(73) Assignee: Xilinx, Inc., San Jose, CA (US)

( * ) Notice: Subject to any disclaimer, the term of this patent is extended or adjusted under 35 U.S.C. 154(b) by 310 days.

(21) Appl. No.: 12/053,874

(22) Filed: Mar. 24, 2008

(51) Int. Cl.
*G06F 17/50* (2006.01)

(52) U.S. Cl. .............................. 716/2; 716/11; 716/19; 703/1

(58) Field of Classification Search ................ 716/2, 716/11.19; 703/1
See application file for complete search history.

(56) References Cited

U.S. PATENT DOCUMENTS

| | | | |
|---|---|---|---|
| 6,795,952 B1 * | 9/2004 | Stine et al. ...................... 716/5 |
| 7,082,594 B1 * | 7/2006 | Milne et al. .................... 716/18 |
| 7,100,134 B2 * | 8/2006 | Wu et al. ......................... 716/5 |
| 7,343,570 B2 * | 3/2008 | Bowers et al. .................. 716/2 |
| 7,512,508 B2 * | 3/2009 | Rajski et al. ................. 702/118 |
| 2005/0015740 A1 * | 1/2005 | Sawicki et al. ................. 716/11 |
| 2005/0234684 A1 * | 10/2005 | Sawicki et al. ................. 703/1 |
| 2007/0011637 A1 * | 1/2007 | Seidl et al. ...................... 716/9 |
| 2007/0230770 A1 * | 10/2007 | Kulkarni et al. ............. 382/149 |
| 2008/0115096 A1 * | 5/2008 | Pikus ............................. 716/4 |
| 2008/0148216 A1 * | 6/2008 | Chan et al. .................... 716/19 |
| 2008/0160646 A1 * | 7/2008 | White et al. .................... 438/5 |
| 2008/0250384 A1 * | 10/2008 | Duffy et al. ................... 716/21 |
| 2009/0031259 A1 * | 1/2009 | Gray et al. ...................... 716/2 |
| 2009/0125866 A1 * | 5/2009 | Wang et al. ................... 716/19 |
| 2009/0187876 A1 * | 7/2009 | Su et al. ........................ 716/19 |
| 2009/0254874 A1 * | 10/2009 | Bose ............................. 716/6 |

* cited by examiner

*Primary Examiner*—Naum B Levin
(74) *Attorney, Agent, or Firm*—LeRoy D. Maunu

(57) ABSTRACT

Various approaches for improving an integrated circuit layout. In one approach, a tree-type hierarchical layout representation of the circuit design is traversed. At each block visited during the traversing, a process determines whether there exists an improvement opportunity for each cell associated with the block. In response to determining that an improvement opportunity exists for a cell of a first block of the plurality of blocks, the process determines whether a modification to the cell satisfies one or more rules for every other block of the block type of the first block in the hierarchical representation. If the rules are satisfied, the modification is stored. Otherwise, the modification is discarded.

19 Claims, 4 Drawing Sheets

METHOD AND APPARATUS FOR IMPROVING A CIRCUIT LAYOUT USING A HIERARCHICAL LAYOUT DESCRIPTION

FIELD OF THE INVENTION

The present invention generally relates to improving the layout for an integrated circuit design using a hierarchical description of the circuit design.

BACKGROUND

After a circuit design has been synthesized, simulated, placed, and routed, designers often analyze a design for compliance with various Design For Manufacturability (DFM) requirements. In addition to DFM analysis of top-down designs, designers also analyze designs constructed from the bottom-up (where the layout is done manually polygon-by-polygon by a layout designer without use of synthesis or place-and-route tools) for compliance with DFM requirements. The DFM requirements are dependent on the particular target semiconductor process technology and are selected in an effort to increase chip yield. For example, the designer may modify the design to improve its manufacturing margin by substituting geometries with higher process margin, slightly changing the spacing and width of interconnect wires, providing fault-tolerant redundant vias, or changing the polygonal shape of some other feature of the circuit design without impacting the size or the performance of the chip (integrated circuit device).

Prior approaches have involved analyzing a design from the bottom up of a layout hierarchy. Each cell in the lowest level of the hierarchy may be analyzed to determine whether a change to the physical makeup of that cell would enhance DFM compliance. There may be many different cells in each level for which DFM requirements are to be analyzed. Furthermore, a change to a cell at one level in the layout hierarchy may create design rule violations at other levels. Finding and correcting these anomalies may be tedious, time consuming and costly.

The present invention may address one or more of the above issues.

SUMMARY OF THE INVENTION

The various embodiments of the invention provide various methods and apparatus for improving an integrated circuit layout. In one embodiment, a method comprises traversing a tree-type hierarchical layout representation of the circuit design. The hierarchical representation includes a plurality of blocks in block-sub-block relationships, and each block has a block type. At each block visited during the traversing, the method determines whether there exists an improvement opportunity for each cell associated with the block. In response to determining that an improvement opportunity exists for a cell of a first block of the plurality of blocks, the method determines whether a modification to the cell satisfies one or more rules for every other block of the block type of the first block in the hierarchical representation. In response to the modification satisfying the one or more rules for every block of the block type of the first block, the method stores the modification to the cell, wherein the modification to the cell is applied to every block of the block type of the first block. In response to the modification violating any of the one or more design rules for any block of the block type of the first block in the hierarchical representation, the method discards the modification to the cell.

In another embodiment, an apparatus is provided for improving an integrated circuit layout. The apparatus comprises means for traversing a tree-type hierarchical layout representation of the circuit design. The hierarchical representation includes a plurality of blocks in block-sub-block relationships, and each block has a block type. The apparatus also comprises means, responsive to each block visited during the traversing, for determining whether there exists an improvement opportunity for each cell associated with the block. The apparatus has a means that is responsive to determining that an improvement opportunity exists for a cell of a first block of the plurality of blocks, for determining whether a modification to the cell satisfies one or more rules for every other block of the block type of the first block in the hierarchical representation. Responsive to the modification satisfying the one or more rules for every block of the block type of the first block, the apparatus has means for storing the modification to the cell, wherein the modification to the cell is applied to every block of the block type of the first block. The apparatus includes means, responsive to the modification violating any of the one or more design rules for any block of the block type of the first block in the hierarchical representation, for discarding the modification to the cell.

An article of manufacture is provided in another embodiment. The article of manufacture comprises a processor-readable storage medium configured with processor-executable instructions for improving an integrated circuit layout. In executing the instructions, the processor traverses a tree-type hierarchical layout representation of the circuit design layout. At each block visited during the traversing, the processor determines whether there exists an improvement opportunity for each cell associated with the block. In response to determining that an improvement opportunity exists for a cell of a first block of the plurality of blocks, the processor determines whether a modification to the cell satisfies one or more rules for every other block of the block type of the first block in the hierarchical representation. In response to the modification satisfying the one or more rules for every block of the block type of the first block, the processor stores the modification to the cell, wherein the modification to the cell is applied to every block of the block type of the first block. And in response to the modification violating any of the one or more design rules for any block of the block type of the first block in the hierarchical representation, the processor discards the modification to the cell.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

For a new process technology, the need for changing a completed layout of a circuit may arise due to newly discovered yield sensitivities for specific circuit patterns. Had these sensitivities been known prior to implementing the design, specific design rules could have been specified and used in creating the layout. However, in instances in which design development is performed concurrently with process development it may not be feasible to have all relevant design rules formulated precisely. Thus, as the manufacturing process evolves, new yield limiting factors may be identified, and minor design rule (DR) or DFM rule tweaks may be needed to improve the layout. However, by the time new enhanced rules are formulated the layout work may have been completed. Thus, the layout may need to be modified in order to enhance its manufacturability, if possible. It is highly desirable to have an automated process and method to do this task, in order to speed up the process.

The embodiments of the invention described below offer alternative automated approaches for improving a circuit layout for manufacturability. The improvements generally modify the shape of a layout feature (polygon) slightly to improve process margin and variations without changing the size of the cell or block to, for example, improve lithography margin, make the feature more amenable to optical proximity correction (OPC), reduce feature physical variability, reduce electrical variability, etc. Example types of improvements/fixes may include added metal overlaps to vias, added redundant vias, added redundant contacts, increased widths of line segments, increased spacing between line segments, and increased line end caps (to mitigate line end shortening).

The various embodiments of the invention preserve the layout hierarchy by traversing the hierarchy of the circuit layout while analyzing improvement opportunities and modifying a feature of the circuit if doing so would not create DR or DFM problems elsewhere in the hierarchy. For a block in the hierarchy of a certain block type and for which an improvement opportunity is identified, the process checks whether a proposed modification would satisfy design and manufacturability rules for every other block of that block type in the hierarchy. If the improvement is acceptable for every such block, the modification is made. If the modification would violate a rule for any instance, the change is rejected.

Various rules may be checked alone or in various combinations. Examples include conventional DRs, DFM rules, model-based DFM rules such as lithography compliance checks (LCCs), critical area checks, chemical-mechanical polishing (CMP) compliance checks and other checks known in the art.

Figure 1:
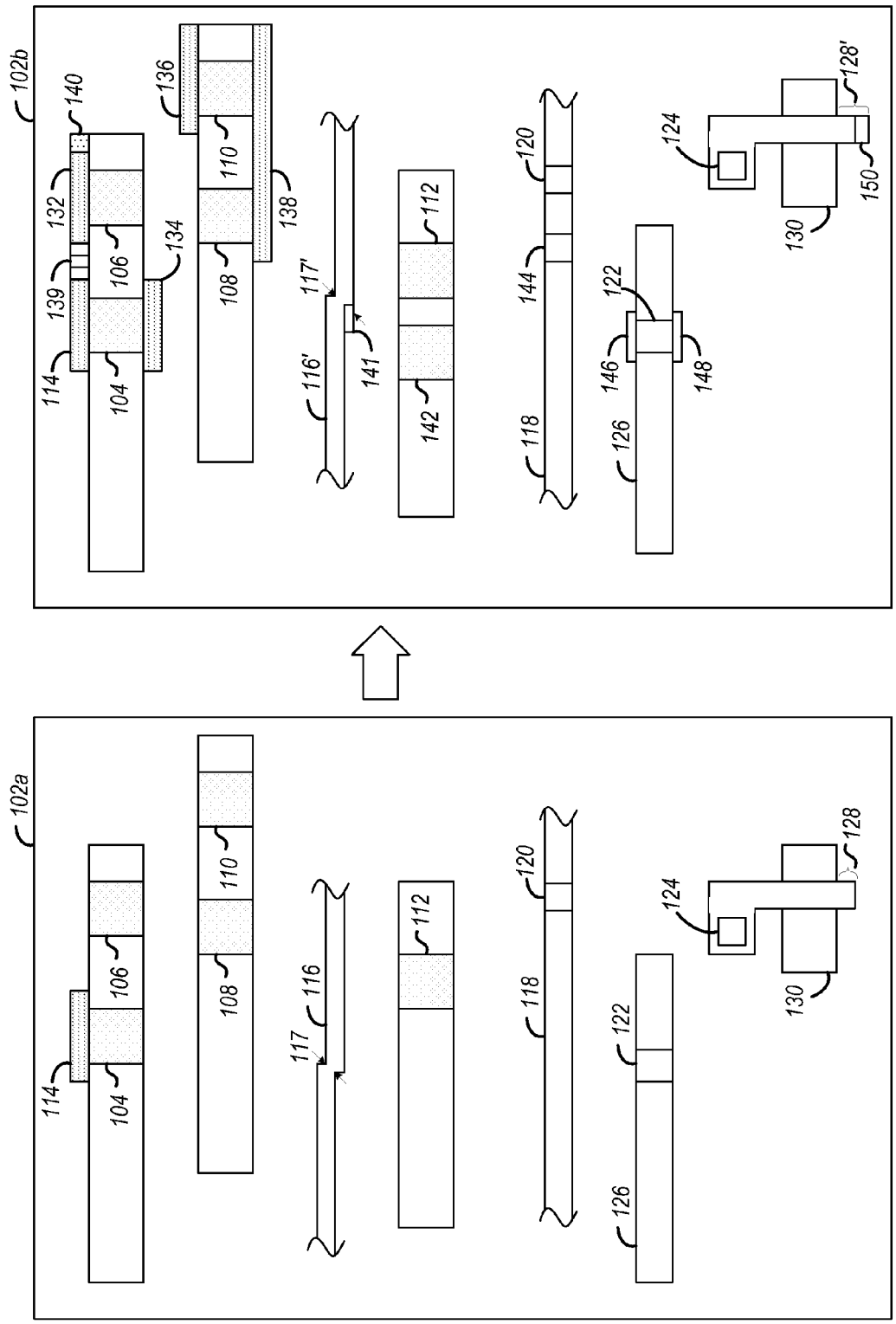
FIG. 1 illustrates example features of cells of an integrated circuit both before and after undergoing Design For Manufacturability (DFM) analysis and modification.

FIG. 1 illustrates example features of cells of an integrated circuit both before and after undergoing design for manufacturability (DFM) analysis and modification. Block 102a illustrates features of an integrated circuit layout before undergoing analysis and modification, and block 102b illustrates the circuit features after undergoing analysis and modification. Circuit features carried over from block 102a to block 102b are designated with the same reference numbers.

The circuit elements in block 102a include vias 104, 106, 108, 110, and 112, via 104 having a border 114, circuit line segments 116 and 118, circuit contacts 120, 122, and 124, metal line segment 126, and poly line 128. Poly line 128 surrounds contact 124 and extends from the contact 124 over diffusion layer 130. The circuit features of block 102a may be modified to improve manufacturability.

Borderless vias may decrease the yield in fabricating an IC. Thus, it may be desirable to add metal overlaps to vias to improve the process margin and reduce via variation. In the example circuit layout 102b, via borders 132, 134, 136, and 138 have been added.

These borders created many notches, i.e., jogs, on the originally straight metal lines. More jogs complicate OPC and lengthen OPC application and verification time, increase data volume of mask data, and increase mask writing time. Therefore, it is highly desirable to reduce the number of jogs. Notch fill 139 and edge extension 140 are added, when possible, to reduce the number of jogs.

The width of circuit line segment 116 is increased as shown by circuit line segment 116' by way of adding polygon 141 to the circuit line to improve conductivity. It may be observed that the width 117 of the line 116 at the jog in the line is increased to the width 117' by way of the added polygon 141.

Via 142 is added as a redundant via of via 112, whereby if either of vias 112 or 142 fails the other continues to provide the circuit connection.

Contact 144 is added as a redundant contact of contact 120, whereby if either one of contacts 120 or 144 fails the other continues to provide the circuit connection. Borders 146 and 148 are added to contact 122 for benefits comparable to the adding of borders to vias.

Endcap 128 is increased in length to endcap 128' with the addition of block 150. A longer endcap may improve poly line end pull back due to sub-wavelength lithography. The transistor poly line end pull back can impact the transistor performance due to narrower gate length (causing a larger leakage current). The line end pull back phenomenon on other layers (such as metal layers) may cause a short or open circuit, which may cause the circuit to malfunction or not function at all.

After the various circuit features have been modified, the process checks whether the circuit with the added polygons satisfies the aforementioned DRs, DFM rules, model-based DFM rules such as lithography compliance checks (LCCs), critical area checks, chemical-mechanical polishing (CMP) compliance checks, etc. The polygons may be individually moved or cut to meet the various rules. In general, the polygons may be moved, added, or cut from one or multiple layers to comply with any DFM rule-based or model-based requirements to improve manufacturability yield.

Those skilled in the art will recognize other circuit features that may be modified to improve manufacturability of the integrated circuit.

Figure 2:
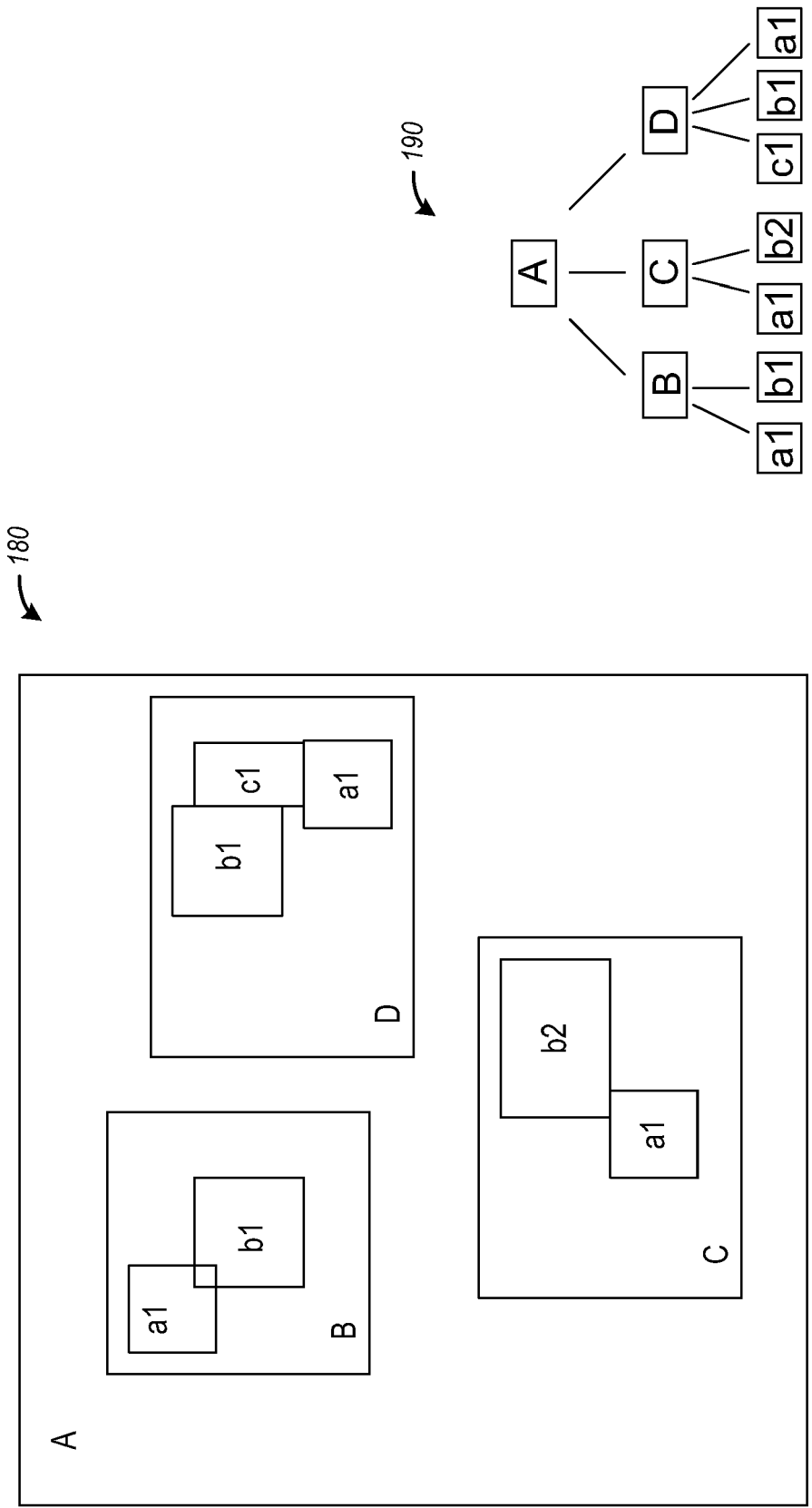
FIG. 2A illustrates a physical layout hierarchy of blocks and sub-blocks of an example design.
FIG. 2B illustrates a tree-type layout hierarchy corresponding to the physical layout hierarchy of FIG. 2A.

FIG. 2A illustrates a physical layout hierarchy 180 of blocks and sub-blocks of an example design, and FIG. 2B illustrates a tree-type layout hierarchy 190 corresponding to the physical layout hierarchy 180 of FIG. 2A. The physical layout hierarchy shows the relative physical placement of the blocks of the design. Block A, being the topmost block in the hierarchy, contains in the physical layout all the sub-blocks, and sub-blocks of sub-blocks. The blocks and sub-blocks of the design contain various ones of the circuit elements illustrated in FIG. 1 at locations proscribed by the layout. Block A physically contains sub-blocks B, C, and D; sub-block B physically contains sub-blocks a1 and b1; sub-block C physically contains sub-blocks a1 and b2; and sub-block D physically contains sub-blocks a1, b1, and c1. There are multiple instances of sub-block a1 in the design with the instances physically residing in the sub-blocks B, C, D. Similarly, there is an instance of sub-block b1 physically residing in sub-block B and an instance of b1 physically residing in sub-block D. There is only one instance each of sub-block b2 and c1.

The tree-type layout hierarchy 190 has blocks and sub-blocks that correspond to the blocks and sub-blocks in the physical layout hierarchy 180. The lines in the tree-type hierarchy represent block-to-sub-block relationships. For example, sub-block a1 is a sub-block of B, which is a sub-block of A. It can also be seen that there are multiple instances of the sub-block a1, respectively contained in sub-blocks B, C, and D.

In the example layout hierarchy sub-block a1 has different interfaces with sub-blocks b1, c1, and b2 in the sub-blocks B, C, and D. In B, a1 and b1 overlap, in C, a1 and b2 abut, and in D a1 and c1 abut. If, for example, a DFM enhancement opportunity is found near the top right corner of a1 in B, since the top right corner of a1 interfaces b2 in C and c1 in D, in order to keep the enhancement made in the instance of a1 in B, the enhancement must satisfy all the DRs and DFMs for the instances of a1 in C and D.

Figure 3:
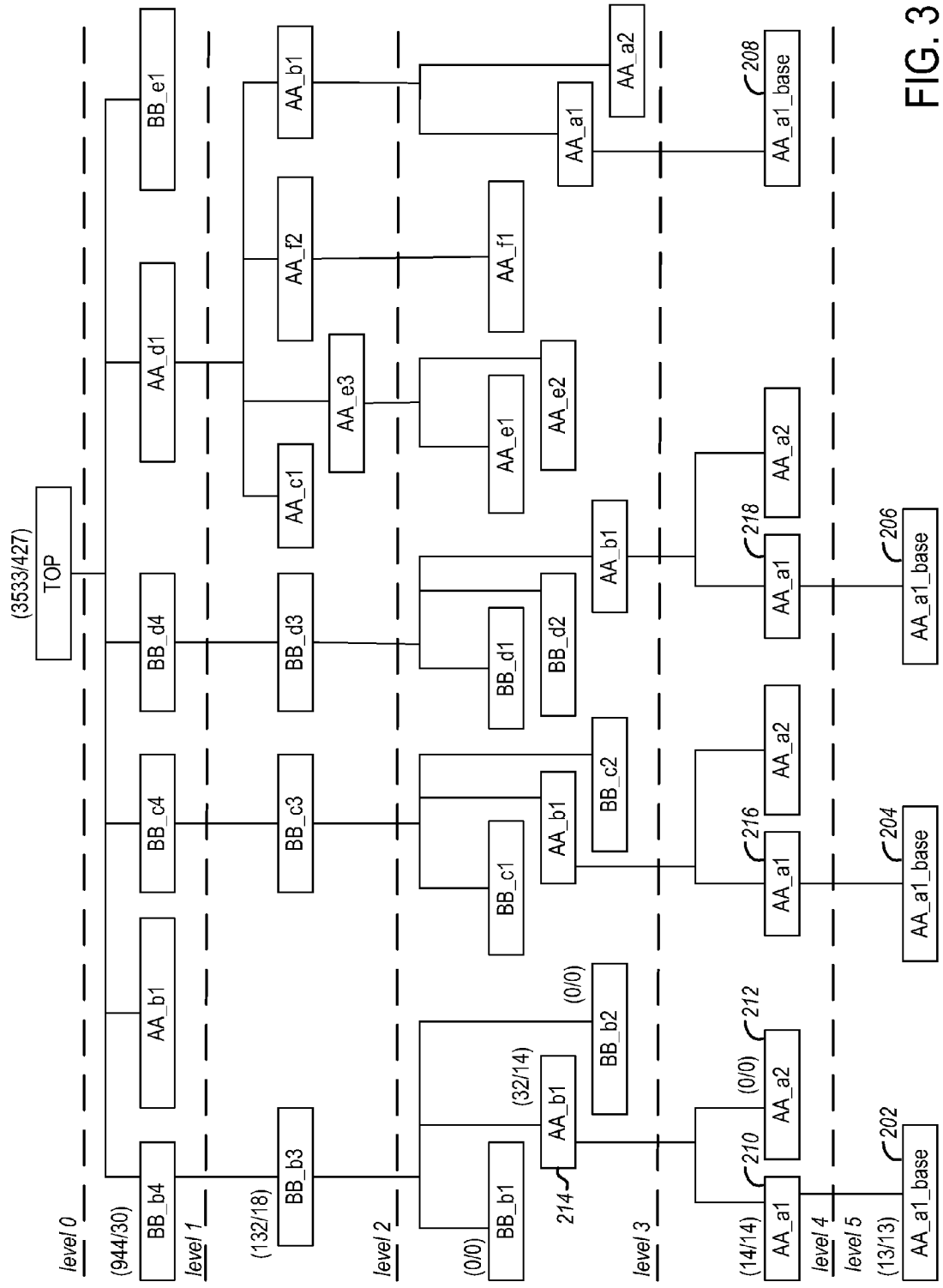
FIG. 3 shows a layout hierarchy for an example circuit design.

FIG. 3 shows a layout hierarchy for an example circuit design in a tree-type layout representation. Each block in the hierarchy represents a functional circuit element used in implementing the design. A block may be comprised of one or more sub-blocks. A block may have associated both constituent circuit cells and one or more sub-blocks. For each block, the constituent cells of the module and associated layout information of those cells are represented by and associated with the block. The example circuit features illustrated in FIG. 1 are representative of those associated with the cells of a block. Thus, each cell may be comprised of one or more of the circuit features illustrated in FIG. 1. The remainder of this discussion uses the term "block" to refer to "sub-blocks" in the interest of brevity. The hierarchical fix methodology described herein may be applied to standard cell placed and routed designs and/or custom layout cells.

Prior approaches for modifying a laid-out circuit design for manufacturability processed the tree-type layout hierarchy by level from the bottom-most level. The example hierarchy is shown as having levels 0-5, with level 5 being the lowest level in the hierarchy. The prior modification process would begin with the blocks and associated cells in the lowest level and attempt modifications to those cells. For example, in level 5, the cells of blocks 202, 204, and 206 would be checked for possible improvements. If the modifications satisfy all requirements and rules then the modifications would be made to the design. Note, however, that the viability of these modifications is not checked for blocks of the same type in other levels (other "instances"). Blocks of the same type are separate instances of the same set of cells in different locations and with connections to different circuitry. For example, the blocks 202, 204, and 206 are of the same type, AA_a1_base.

When the modifications to the cells of blocks 202, 204, and 206 are made, the prior art process did not check the viability of the modifications to block 208, which is also of block type, AA_a1_base but is in level 4. Thus, when the prior art approach processed the blocks in level 4 and block 208 in particular, if the modifications to the cells of block 208 were found to violate any requirements or rules, not only would the modifications not be applied to block 208, but the previously made modifications to the cells of blocks 202, 204, and 206 would be undone. Thus, the prior art approach may entail a significant amount of undoing modifications made in the lower levels.

Alternatively, the prior art process may keep the modifications to the blocks 202, 204, and 206 in level 5, but change the definition of block 208 such that it is no longer a block type, AA_a1_base; the changes made to blocks 202, 204, and 206 would differentiate those blocks from block 208. Thus, in order to achieve the desired modifications to enhance manufacturability, the prior art process would have had to modify the layout hierarchy by way of changing the specifications for instances of blocks that were previously identical. Changing the hierarchy may make any further modification of layout much more complicated. For example, instead of changing only one cell, two or more different cells may need to be changed and connectivity checks may become more complicated.

According to an embodiment of the present invention, the layout hierarchy is processed using a depth-first traversal. Assuming the traversal proceeds from left to right, block 202 would be the first block considered for modification. The process determines whether there exist any opportunities for improving manufacturability by way of modifying the cells of the block. For each such modification, a proposed feature modification is made to one or more of the cells of the block, and the block is checked against the design and manufacturing rules and requirements. If the modified block is in compliance, then every block of that block type, with the proposed modification, in the layout hierarchy is tested for compliance. For example, the process traverses the layout hierarchy in search of other blocks of block type, AA_a1_base. The process determines whether each of blocks 204, 206, 208 with the proposed modifications complies with the design and manufacturing rules and requirements. If so, the modification is applied to each block of that block type (e.g., 204, 206, 208), and the modified blocks are saved. Otherwise, the proposed modification is discarded.

The pairs of numbers in parentheses are examples of numbers of possible modifications and numbers of accepted modifications for an example subset of the blocks. For block 202, 13 possible modifications were considered and all 13 modifications were compliant with the design and manufacturing rules and requirements; for block 210, 14 possible modifications were considered and all 14 modifications were compliant; for block 212 no modifications were considered or made; for block 214, 32 possible modifications were considered and 14 modifications were compliant. Note that at the top levels of the hierarchy a very large number of modifications may be possible. With the prior art, many of these modifications would have been made and then been undone once the process reached the top levels of the hierarchy.

Figure 4:
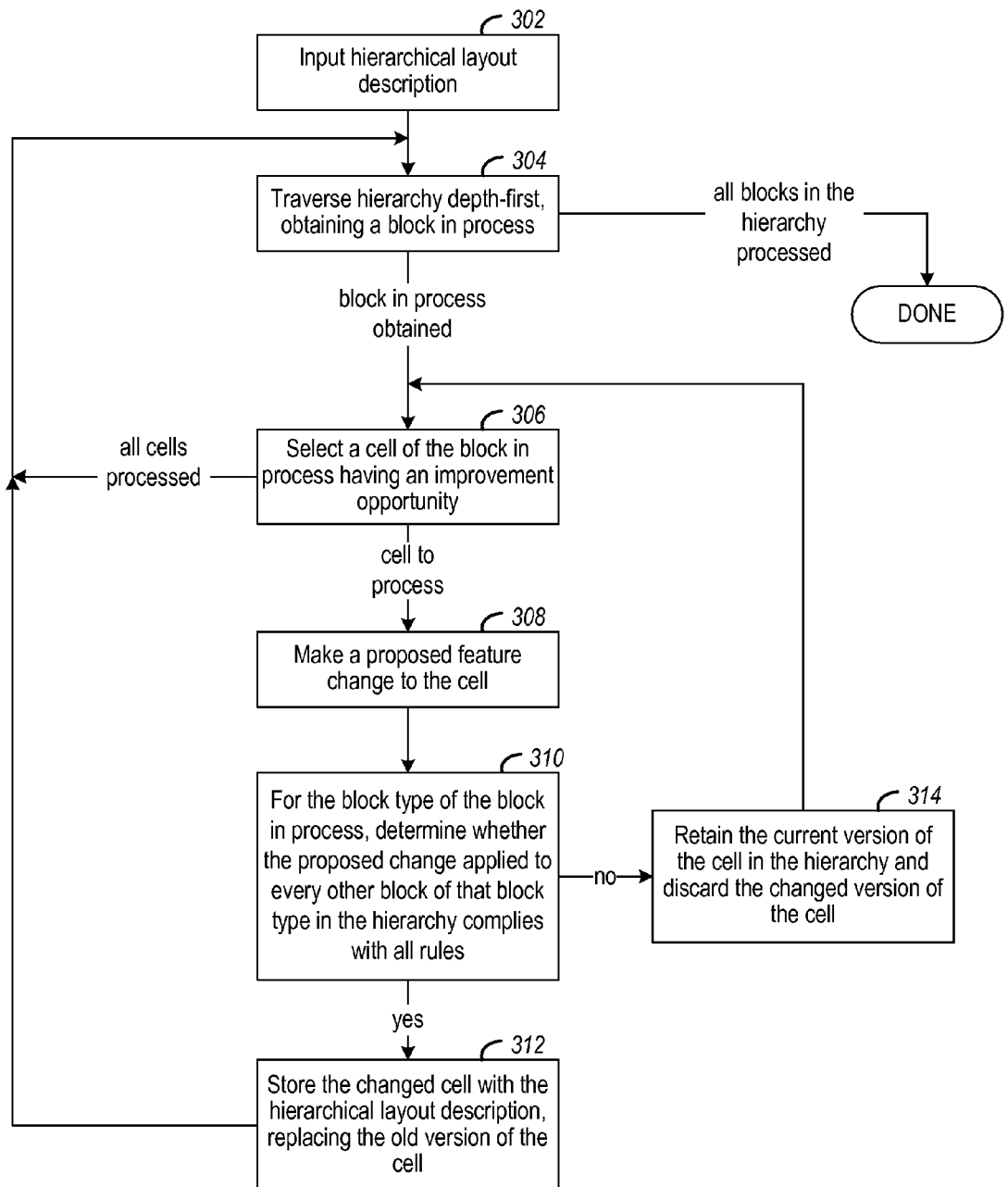
FIG. 4 is a flowchart of an example process for processing a circuit design layout in accordance with an embodiment of the invention.

FIG. 4 is a flowchart of an example process for processing a circuit design layout in accordance with an embodiment of the invention. The process of FIG. 4 begins after suitable yield analysis has been performed for chips manufactured in accordance with an initial set of design and manufacturing parameters and rules. Such analysis may have identified certain improvement opportunities for circuit features such as those described in FIG. 1. The improvement opportunities are specified such that cells in the design may be identified and selected for processing. Together with these improvement opportunities, additional DR and DFM rules may have been formulated to obtain the desired yield, with possible restrictions on the applicability of the feature changes.

At step 302, the process inputs the hierarchical layout description. For example, in FIG. 3, data descriptive of the illustrated hierarchy is input for processing. The hierarchical layout description includes blocks and their designated types, the hierarchical relationship amongst the blocks, descriptions and identifiers of cells that comprise the block, and location information that describes locations of the cells on a chip.

In one embodiment, the process uses a depth-first traversal of the hierarchy of blocks in selecting which block to process, as shown by step 304. In another embodiment, a breadth-first traversal is used, and in another embodiment a combination of depth-first and breadth-first traversals is used. The algorithms may be optimized for specific layout hierarchies. Until all the blocks have been analyzed for possible improvements, the process continues with step 306 for the block obtained at step 304 ("block in process"). At step 306, from the block in process a cell is selected having a circuit feature with one or more of the identified improvement opportunities. For example, if the cell has one or more vias without borders and the improvement opportunities include adding borders to vias, the cell may be selected. When all the cells in the block in process having improvement opportunities have been considered, the process proceeds to step 308.

A single cell may have different types of improvement opportunities, e.g., vias without borders and single contacts. Example improvement opportunities include: adding borders to vias, adding borders to contacts, adding redundant via, adding redundant contact, adding line end, etc. Other types include moving/adding/cutting polygons of one layer in certain locations to comply with lithography or other rule- and/or model-based DFM requirements. Polygons on several layers may be simultaneously moved/added/cut to comply with DFM requirements. For example, a polygon on a metal layer may be moved slightly to comply with litho requirements, which may necessitate moving a contact and/or via to accommodate the change in metal line/polygon position.

At step 308, a proposed feature change is made to the selected cell. For example, borders may be added to vias for which one or more borders are not present. The process then proceeds to step 310 to determine whether the proposed change complies with all DRs and DFM rules for all blocks of the same block type as the block in process. If the modification to the circuit feature is compliant for all instances of the cell in all other blocks of the block type in the hierarchy, the changed cell is stored with the hierarchical layout description at step 312, thereby replacing the prior version of the cell. If the proposed change as applied to any instance of the cell for any block of the block type is non-compliant with any of the DRs or DFM rules, then the current version of the cell is retained and the proposed change is discarded at step 314. The process then returns to step 306 to process any remaining cells associated with the block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for improving the manufacturability of a circuit design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor based method for improving an integrated circuit layout, the method comprising:
   using one or more processors programmed to perform operations including:
   traversing a tree-type hierarchical layout representation of the circuit design, wherein the hierarchical representation includes a plurality of blocks in block-sub-block relationships, and each block has a block type;
   at each block visited during the traversing, determining whether there exists an improvement opportunity for each cell associated with the block; and
   before continuing the traversing to another block in the tree-type hierarchical layout representation, performing further operations including:
      in response to determining that an improvement opportunity exists for a cell of a first block of the plurality of blocks, determining whether a modification to the cell satisfies one or more rules for every other block of the block type of the first block in the hierarchical representation;
      in response to the modification satisfying the one or more rules for every block of the block type of the first block, storing the modification to the cell, wherein the modification to the cell is applied to every block of the block type of the first block; and
      in response to the modification violating any of the one or more rules for any block of the block type of the first block in the hierarchical representation, discarding the modification to the cell.

2. The method of claim 1, wherein the traversing comprises a depth-first traversal.

3. The method of claim 1, wherein the modification comprises a border added to a via.

4. The method of claim 1, wherein the modification comprises a pair of borders added to a via.

5. The method of claim 1, wherein the modification comprises an addition of a redundant via.

6. The method of claim 1, wherein the modification comprises an addition of a redundant contact.

7. The method of claim 1, wherein the modification comprises a border added to a contact.

8. The method of claim 1, wherein the modification comprises a pair of borders added to a contact.

9. The method of claim 1, wherein the modification comprises an increased width of a line segment.

10. The method of claim 1, wherein the modification comprises an increase in a line endcap.

11. A system for improving an integrated circuit layout, comprising:
    one or more processors; and
    a memory arrangement coupled to the one or more processors and configured with program code that when executed by the one or more processors causes the one or more processors to perform operations including:
    traversing a tree-type hierarchical layout representation of the circuit design, wherein the hierarchical representation includes a plurality of block in block-sub-block relationships, and each block has a block type;
    at each block visited during the traversing, determining whether there exists an improvement opportunity for each cell associated with the block; and
    before continuing the traversing to another block in the tree-type hierarchical layout representation, performing further operations including:
       in response to determining that an improvement opportunity exists for a cell of a first block of the plurality of blocks, determining whether a modification to the cell satisfies one or more rules for every other block of the block type of the first block in the hierarchical representation;
       in response to the modification satisfying the one or more rules for every block of the block type of the first block, storing the modification to the cell, wherein the modification to the cell is applied to every block of the block type of the first block; and in response to the modification violating any of the one or more rules for any block of the block type of the first block in the hierarchical representation, discarding the modification to the cell.

12. An article of manufacture, comprising:

a processor-readable storage device configured with processor-executable instructions for improving an integrated circuit layout by performing steps including:

traversing a tree-type hierarchical layout representation of the circuit design, wherein the hierarchical representation includes a plurality of blocks in block-sub-block relationships, and each block has a block type;

at each block visited during the traversing, determining whether there exists an improvement opportunity for each cell associated with the block; and before continuing the traversing to another block in the tree-type hierarchical layout representation, performing further steps including:

in response to determining that an improvement opportunity exists for a cell of a first block of the plurality of blocks, determining whether a modification to the cell satisfies one or more rules for every other block of the block type of the first block in the hierarchical representation;

in response to the modification satisfying the one or more rules for every block of the block type of the first block, storing the modification to the cell, wherein the modification to the cell is applied to every block of the block type of the first block; and in response to the modification violating any of the one or more rules for any block of the block type of the first block in the hierarchical representation, discarding the modification to the cell.

13. The article of manufacture of claim 12, wherein the traversing comprises a depth-first traversal.

14. The article of manufacture of claim 12, wherein the modification comprises one or more borders added to a via.

15. The article of manufacture of claim 12, wherein the modification comprises an addition of a redundant via.

16. The article of manufacture of claim 12, wherein the modification comprises an addition of a redundant contact.

17. The article of manufacture of claim 12, wherein the modification comprises one or more borders added to a contact.

18. The article of manufacture of claim 12, wherein the modification comprises an increased width of a line segment.

19. The article of manufacture of claim 12, wherein the modification comprises an increase in a line endcap.

* * * * *